United States Patent
Bajaj et al.

(10) Patent No.: US 8,707,294 B2
(45) Date of Patent: Apr. 22, 2014

(54) MODEL FOR SYSTEM-WIDE APPLICATION EXTENSION

(75) Inventors: Aseem Bajaj, San Francisco, CA (US); Prasanth Pallamreddy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1194 days.

(21) Appl. No.: 12/419,685

(22) Filed: Apr. 7, 2009

(65) Prior Publication Data

US 2010/0257508 A1 Oct. 7, 2010

(51) Int. Cl.
*G06F 9/44* (2006.01)

(52) U.S. Cl.
USPC .......................................... 717/175; 717/111

(58) Field of Classification Search
USPC ........................................................ 717/175
See application file for complete search history.

(56) References Cited

U.S. PATENT DOCUMENTS

| | | | |
|---|---|---|---|
| 2005/0065678 A1* | 3/2005 | Smith et al. | 701/29 |
| 2005/0066303 A1* | 3/2005 | Rochette et al. | 717/100 |
| 2005/0208930 A1* | 9/2005 | Zmrzli | 455/414.4 |
| 2009/0031313 A1* | 1/2009 | Tian | 718/102 |

\* cited by examiner

*Primary Examiner* — Wei Zhen
*Assistant Examiner* — Mohammed Huda
(74) *Attorney, Agent, or Firm* — Meyer IP Law Group

(57) ABSTRACT

A model for extending application server functionality includes two types of libraries: an automatically-referenced (auto-ref) library and a superseding library. The auto-ref library includes a special tag that identifies it as the auto-ref library and a pattern that restricts the application types that can refer to it. Once the auto-ref library is deployed, it is automatically referred to by all applications as long as they are not excluded by the restricting pattern. The code contained in the auto-ref library is merged into the application code and the configuration of the library is merged into the application configuration at deployment time. The superseding library also includes an identifying tag and a restriction pattern. At deployment, however, the code and configuration data in the superseding library overrides the corresponding application configuration and code. The remaining code of the application that is not overridden by the superseding library is used without any modification.

20 Claims, 4 Drawing Sheets

MODEL FOR SYSTEM-WIDE APPLICATION EXTENSION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to application servers and more specifically to code libraries used by the applications on the server.

BACKGROUND

Application servers form a foundation for developing and executing c-commerce applications, providing the presentation, business and information access logic, security and management services, and the underlying infrastructure needed for highly scalable and mission critical software applications. An application server typically supports a variety of clients, such as web browsers and wireless devices, as well as different operating systems, databases, message queues and legacy systems. As such, applications servers have traditionally provided the advantages of data and code integrity, centralized configuration, security, transactional support and overall cost benefits for various software applications.

Today, applications servers are often repackaged by numerous middleware products in order to provide additional functionality on top of the application server. As an illustration, a middleware product may provide functionality that allows all applications on the server to perform specialized functions, such as event monitoring or security services. In many cases, these higher layer middleware products leverage the deployment infrastructure of the application server. In such cases, hooks are usually provided to the application server in order to listen for various deployment events. The hooks can then be used by the middleware products to execute additional code upon deploying an application (e.g. additional code that provides the functionality of the higher layer product). As an example, a security product may need to execute code in order to track various security events for all servlets on the server. Similarly, a monitoring product may need to include code that monitors all applications, and the like.

However, the hooks used to execute additional functionality are often difficult to maintain and frequently require changes to the application server for each new type of integration. A subset of such integration scenarios require a mere extension to application behavior, either in terms of application code, or application configuration. This can be thought of as the application extension problem.

Some of these difficulties can be partially resolved by the use of shared libraries. A shared library contains application fragments that can be merged into the user application at deployment time. Higher layer products can thus provide their own shared application libraries that their users can refer to from their applications. However, this typically requires the user to explicitly add such a reference. Asking a user to add an explicit reference to their application is less usable and tedious on the software developer. In addition, it is often quite possible that the user will forget to add the reference(s). In such cases, the application would deploy without problems, yet would behave incorrectly, thereby increasing the testing and debugging efforts. What is needed is a more user friendly approach to repackaging the application server in order to extend functionality of the applications deployed thereon. Applicants have identified the foregoing as well as other needs that currently exist in the art in coming to conceive the subject matter of the present disclosure.

SUMMARY OF THE INVENTION

A model for extending application functionality is described. The model uses two types of libraries in order to simplify the solution to application extension for higher layer products: an automatically-referenced (auto-ref) library and a superseding library. The auto-ref library includes a special tag that identifies it as the auto-ref library and a pattern that restricts the application types that can refer to it. Once the auto-ref library is deployed, it is automatically referred to by all applications as long as they are not excluded by the restricting pattern. The code contained in the auto-ref library is merged into the application code and the configuration of the library is merged into the application configuration at deployment time.

The superseding library also includes a special tag that identifies it as a superseding library and a pattern that restricts the applications types that can refer to it. When the superseding library is deployed, it is automatically referred to by all applications unless they are restricted by the pattern. The referencing causes the code and configuration data in the superseding library to override the application configuration and code. The remaining code of the application that is not overridden by the superseding library is used without any modification.

In the various embodiments, the application server can be repackaged into a higher layer middleware product by deploying its code extensions as one of the two types of libraries. As a result, the users can leverage these extensions without performing any additional work. A developer can merely deploy their applications without any changes, avoiding the need to reference each shared library in each server application.

DETAILED DESCRIPTION

Figure 1:
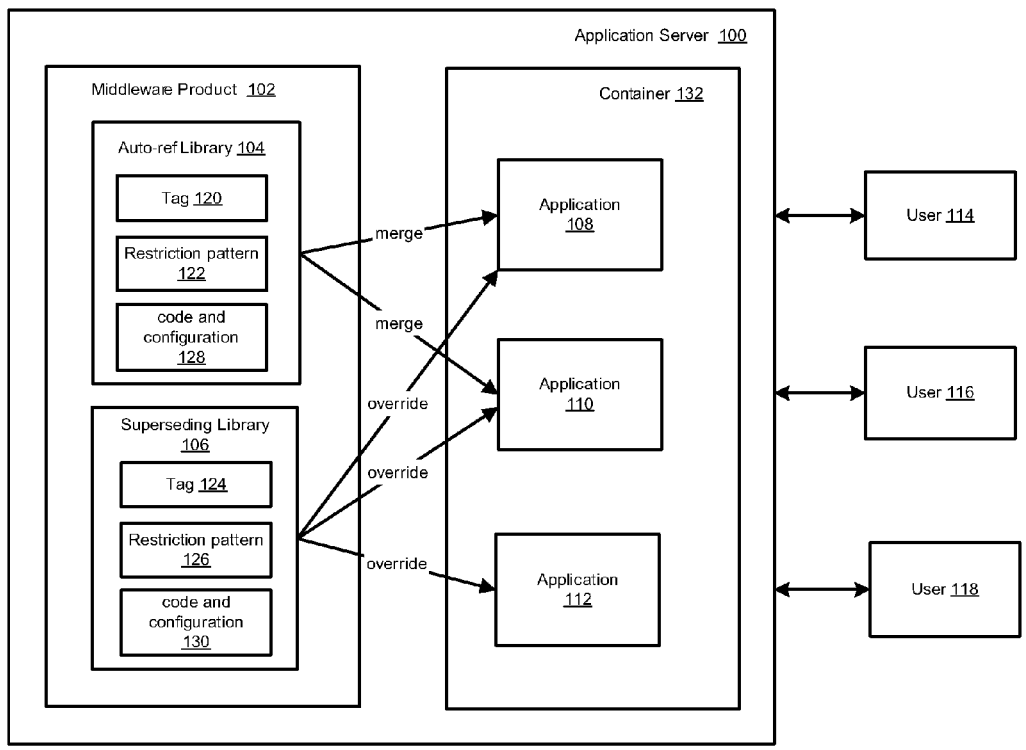
FIG. 1 is an illustration of a middleware product packaged as a set of auto-ref libraries and superseding libraries on the application server, in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with the embodiments of the invention, systems and methods are described for enabling a new system-wide application extension model. The new model enables the repackaging of an application server and extending the functionality of applications deployed thereon. This model can be used by various products built on top of the deployment model of the application server. For example a security product can use the new extension model to bundle its functionality into each application that is deployed on the application server. Similarly, a monitoring service may use the model to inject its monitoring functionality into all applications deployed on the application server.

The model is comprised of an automatically referenced (auto-ref) library and a superseding library. Auto-ref libraries are deployed as a shared library with two additional pieces of information: a special tag to identify it as an auto-ref library; and a pattern that restricts the application types that can refer to it. In one embodiment, the default restriction pattern specifies no restrictions on the auto-ref library.

Once an auto-ref library is deployed, it is automatically referred to by any application that is deployed on the server, as long as it is not excluded by the restriction pattern. This causes the code contained in the auto-ref library to be merged in the application code. In one embodiment, this also causes the configuration data in the auto-ref library to be merged into the application configuration.

Superseding (system-dominant) libraries can also be deployed like other application libraries with two additional pieces of information: a special tag to identify it as a superseding library; and a pattern that restricts the application types that can refer to it. Once again, the default can be no restriction.

Once a superseding library is deployed, it is automatically referred to by any application that is deployed on the server, as long as it is not excluded by the restriction pattern of the superseding library. This causes the code of the superseding library to override the application code and the configuration of the library to override the application configuration. The code and configuration in the application that is not overridden by the superseding library is used without any modification.

It should be noted that the superseding library differs from the auto-ref library in that the superseding library code and configuration take precedence over the application code and configuration, while the auto-ref library code and configuration are supplementary to the application code and configuration. For example, if the same class or component is defined in both the auto-ref library and the application, the application component will be the one actually used. If the same component is defined in the superseding library, however, the version in the superseding library will override the version in the application. This distinction allows the repackaged server to provide helpful and optional tools for the application developer, while at the same time retaining the ability to enforce certain rules (e.g. security) on all applications deployed on the server.

In order to repackage the application server, the higher level products can deploy their extensions as one of the above two types of libraries. The users can then leverage these extensions without performing any additional integration work. They can simply deploy an application without any change to the code.

FIG. 1 is an illustration of a middleware product packaged as a set of auto-ref libraries and superseding libraries on the application server, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the application server 100 can be repackaged as a higher layer middleware product 102 that uses the deployment infrastructure of the server. The extensions provided by the middleware product can be deployed as a set of auto-ref libraries 104 and superseding libraries 106.

Each auto-ref library 104 contains a tag 120 that identifies it as an auto-ref library to the server. Upon deployment of the library, the server can recognize the tag and automatically reference all applications to this library. The auto-ref library also contains code and configuration information 128 that will be merged by the container 132 into all of the applications deployed on the server, unless the application is excluded by the restriction pattern 122. The restriction pattern 122 restricts the types of applications that can refer to the shared library 104. For example, as illustrated in the figure, the restriction pattern 122 of the auto-ref library excludes application 112. As a result of this restriction, the code/configuration of the library is not merged into the application at deployment. In one embodiment, if the application is excluded by the restriction pattern, it will not be automatically referenced to the library by the server, but can still be manually referenced by the application developer.

Each superseding library 106 also includes an identifying tag 124, a restriction pattern 126, and application fragment code and configuration data 130. In this particular illustration, the restriction pattern is null and thus the superseding library gets referenced to all of the applications 108, 110, 112 on the server. However, in contrast to the auto-ref library, the code and configuration of the superseding library 106 actually overrides the code of the application, rather then being merely merged with the application code. This concept will be further illustrated in FIG. 2 and the accompanying description.

The middleware product can thus deploy its extensions as a set of auto-ref libraries and superseding libraries and the users 114, 116, 118 do not need to manually maintain the references in their application code.

Figure 2:
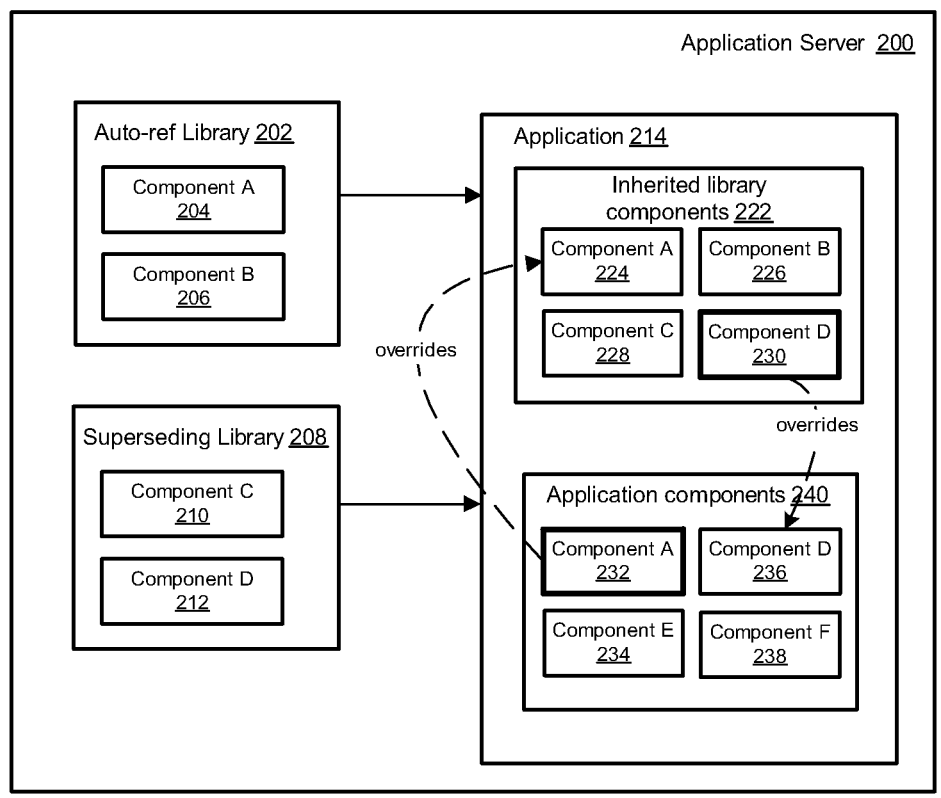
FIG. 2 is an illustration of merging and overriding code and configuration at the application server, in accordance with various embodiments of the invention.

FIG. 2 is an illustration of merging and overriding code and configuration at the application server, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the auto-ref library 202 includes components 204, 206 and the superseding library 208 contains components 210, 212. These components can include but are not limited to programming code and configuration information. For example, a component may be a class, a function, a routine, a subroutine, a bean, a pages and the like. Similarly, a component can be a piece of configuration information that configures the application settings, etc.

The library components are inherited by the application 214 when the server automatically references the application to the libraries. Thus, once automatically referenced, the application contains a set of library components 222 that include inherited components 224, 226, 228, 230.

In addition, the application may contain its own components 240 defined by the developer, such as components 232, 234, 236, 238. In certain instances, the components defined by the application developer and those inherited from the libraries may overlap. For example, the application developer may define his/her own version of component A 232, which has already been inherited from the auto-ref library. Similarly, a developer can define a component D which has been inherited from the superseding library. In the past, code libraries have generally given precedence to the application developers in order to allow them to define custom components that can be functionally different from the corresponding library component. However, in certain cases, it can be desirable to preclude the developer from changing the functionality defined in the library. As such, the components in the superseding library override the components defined in the application. For example, even if the developer defines a custom component D in the application, the component D 230 inherited from the superseding library will take precedence over the application component D 236.

For auto-ref library components, precedence is still given to the application developer. Thus, if the developer chooses, he or she can implement their own custom version of component A 232, which will override the component A 224 inherited from the auto-ref library.

Figure 3:
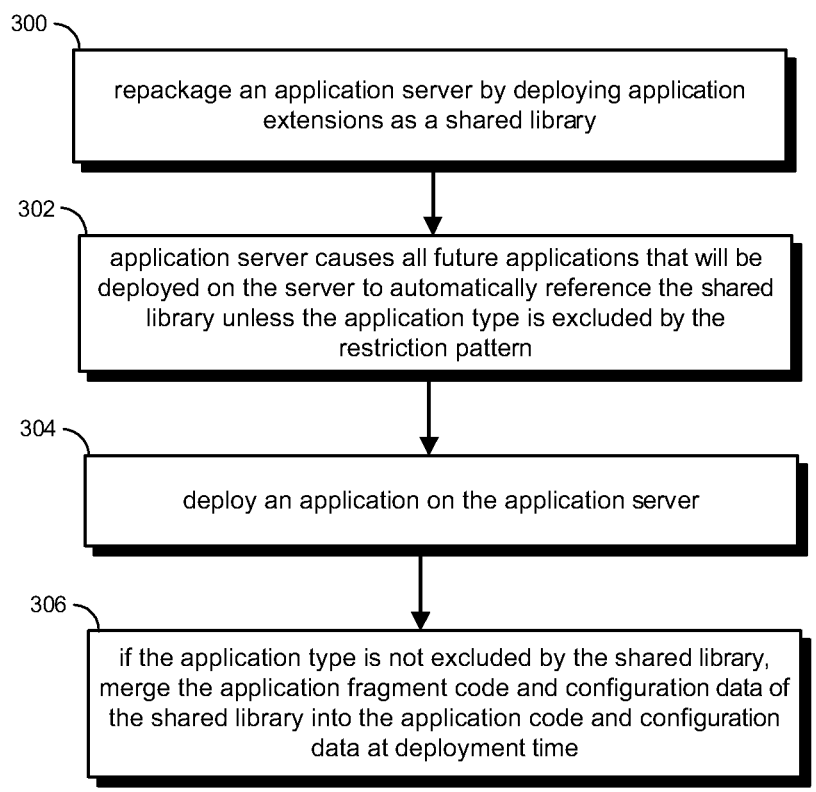
FIG. 3 is a flow chart diagram of the process for providing extensions to the application server as a set of libraries, in accordance with various embodiments of the invention.

FIG. 3 is a flow chart diagram of the process for providing extensions to the application server as a set of libraries, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown, in step 300, the application server can be repackaged by providing a set of extensions as shared libraries. In step 302, the application server causes all future applications which are deployed on the server to automatically reference the shared library unless the application type is excluded by the restriction pattern. Existing applications on the application server get the extension only if they are redeployed or if the server is restarted. Accordingly, it can be recommended that auto-ref and system libraries be deployed at server startup before the first request for application deployment comes in. It should be noted, however, that this recommendation is not intended to limit or restrict the scope of the invention in any way.

In step 304, an application is deployed on the server. In step 306, if the application type is not excluded by the shared library, the application fragment code and configuration data of the shared library is merged into the application code and configuration data.

Figure 4:
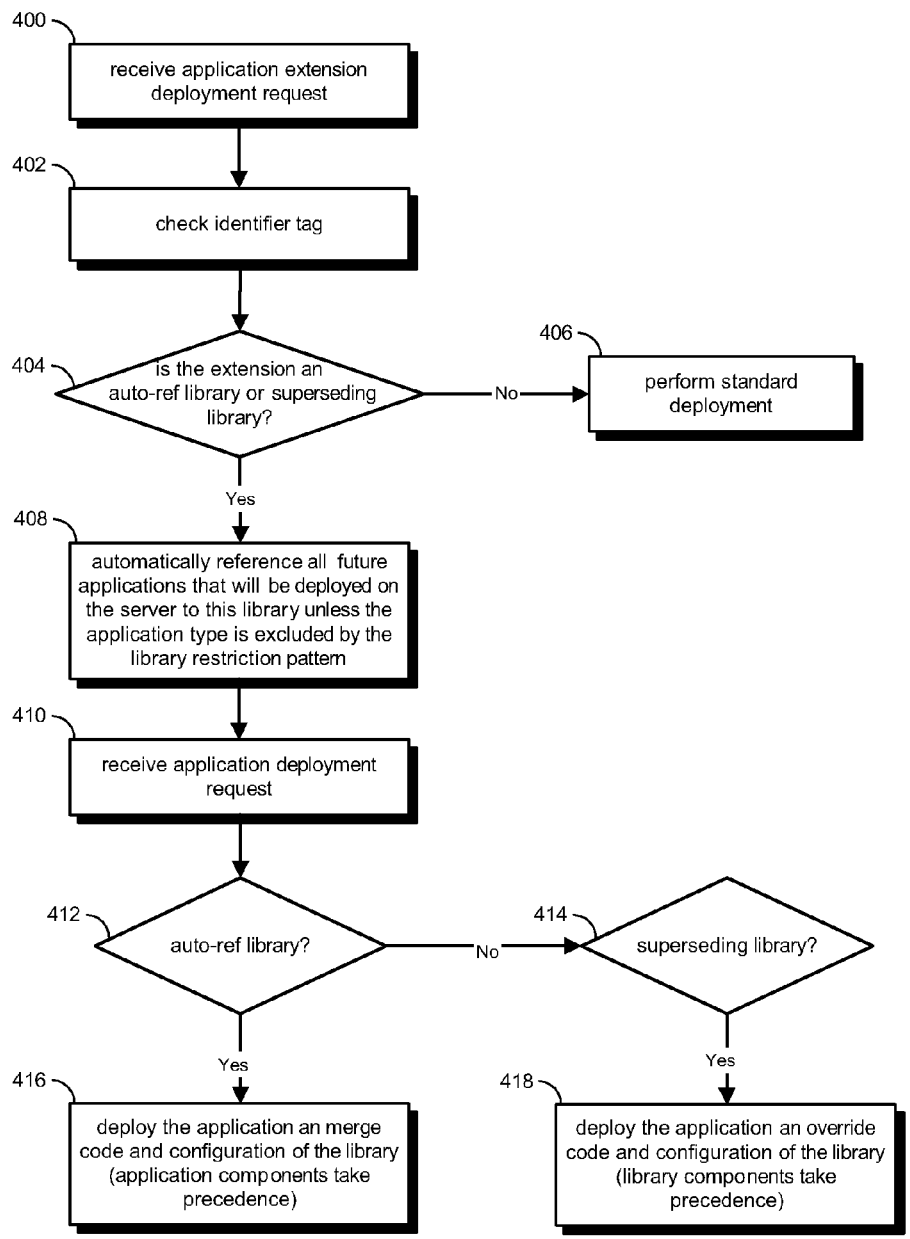
FIG. 4 is a flow chart diagram of the process for deploying the auto-ref and superseding libraries, in accordance with various embodiments of the invention.

FIG. 4 is a flow chart diagram of the process for deploying the auto-ref and superseding libraries, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, a request is received to deploy an extension to the application server. This extension can be a library containing a set of code fragments and configuration information. In step 402, the server checks the identifier tag of the extension. If the extension neither an auto-ref library nor a superseding library (step 404), the application server performs standard deployment, as shown in step 406. On the other hand, if the extension is one of the two-types of libraries, the server automatically references all future applications deployed on the server to that library, unless the application type is excluded by the restriction pattern, as shown in step 408.

Subsequently, in step 410, a request to deploy an application is received at the server. If the extension is an auto-ref library (step 412), the application server deploys the application and merges the code and configuration of the library into the application code and configuration, as shown in step 416. If the application contains the same code or configuration components, the application components take precedence over the auto-ref library.

In step 414, if the library is a superseding library, the code and configuration of the library overrides the application code and configuration at deployment time (step 418). In other words, even if the application defines the same code or configuration components, the library components still take precedence and will be deemed controlling.

In various aspects, the embodiments described throughout this disclosure encompass computer apparatus, computing systems and machine-readable media configured to carry out the foregoing methods. In addition to an embodiment consisting of specifically designed integrated circuits or other electronics, the present invention may be conveniently implemented using one or more conventional general purpose or a specialized digital computers or microprocessors programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments also include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing a model for system-wide application extension, said system comprising:
    an application server that executes on one or more microprocessors, wherein the application server includes a plurality of applications, wherein each application is associated with an application type, and includes application code and application configuration data;
    a first shared library that contains fragment code, fragment configuration data, and a first tag, wherein the first shared library is identified by the application server as an auto-ref library using the first tag;
    wherein when a particular application of said plurality of applications is deployed as a particular deployed application on the application server, the application server causes the particular deployed application to automatically reference the auto-ref library unless the application type associated with the particular application is excluded by the auto-ref library;
    wherein when referencing the auto-ref library, the fragment code and the fragment configuration data of the auto-ref library are automatically merged into the application code and application configuration data of the particular application at deployment time without replacing any conflicting application code, and wherein conflicting application code and application configuration data of the particular application are used without modification in the particular deployed application;
    a second shared library that contains superseding code, superseding configuration data, and a second tag, different than the first tag, wherein the second shared library is identified by the application server as a superseding library using the second tag;
    wherein when the particular application is deployed on the application server as the particular deployed application, the application server causes the particular deployed application to automatically reference the superseding library unless the application type associated with the particular application is excluded by the superseding library; and
    wherein when referencing the superseding library, the superseding code and the superseding configuration data override the application code of the particular application, such that conflicting application code and configuration data of the particular application is replaced by the superseding code and superseding configuration data in the particular deployed application, and wherein application code and application configuration data of the particular application that is not replaced by the superseding library is used without modification in the particular deployed application.

2. The system of claim 1, wherein the superseding library further includes a restriction pattern that excludes a set of application types from referring to the superseding library, such that applications having any of the set of application types are not automatically referenced by the application server.

3. The system of claim 1, wherein the auto-ref library further includes a restriction pattern that excludes a set of application types from referring to the auto-ref library, such that applications having any of the set of application types are not automatically referenced by the application server.

4. The system of claim 3, wherein the restriction pattern is configured in a manifest file as a name value pair.

5. The system of claim 3, wherein the restriction pattern is configured using a graphical user interface.

6. The system of claim 1, wherein the application server is repackaged as a middleware product by deploying a set of extensions as one or more auto-ref libraries and superseding libraries.

7. The system of claim 1, wherein a container of the application server merges the fragment code and the fragment configuration data into the application code and the application configuration data at the time of deploying the plurality of applications.

8. The system of claim 1, wherein a system filter is deployed as a shared library on the application server, such that said system filter intercepts requests flowing to the plurality of applications and performs monitoring or security functionality on the requests.

9. A method for providing a model for system-wide application extension, said method comprising:
    repackaging an application server that executes on one or more microprocessor by deploying one or more application extensions as at least a first shared library and a second shared library on said application server,
        wherein the first shared library includes fragment code and fragment configuration data to implement the one or more application extensions, and a first tag which identifies the first shared library as an auto-ref library, and
        wherein the second shared library contains superseding code and superseding configuration data and a second tag, different than the first tag, which identifies the second shared library as a superseding library;
    deploying a plurality of applications on the application server, wherein each application is associated with an application type, and includes application code and application configuration data;
    wherein when a particular application of said plurality of applications is deployed on the application server as a particular deployed application, the application server causes the particular deployed application to automatically reference the auto-ref library unless the application type associated with the particular application is excluded by the auto-ref library; and automatically merging the fragment code and the fragment configuration data of the auto-ref library with the application code and the application configuration data of the particular application upon deployment; wherein when referencing the auto-ref library, the fragment code and the fragment configuration data of the auto-ref library are merged into application code and application configuration data of the particular deployed application without replacing conflicting application code and configuration data, and wherein conflicting application code and application configuration data of the particular application are used without modification in the particular deployed application;

wherein when the particular application is deployed on the application server, the application server also causes the particular deployed application to automatically reference the superseding library unless the application type associated with the particular application is excluded by the superseding library; and automatically merging the application code and configuration data of the particular application with the superseding code and the superseding configuration information, wherein when referencing the superseding library, the superseding code and the superseding configuration data override the application code of the particular application, such that conflicting application code and application configuration data is replaced by the superseding code and superseding configuration data in the particular deployed application, and application code and application configuration data or the particular application that is not replaced by the superseding library is used without modification in the particular deployed application.

10. The method of claim 9, wherein the superseding library further includes a restriction pattern that excludes a set of application types from referring to the superseding library, such that applications having any of the set of application types are not automatically referenced by the application server.

11. The method of claim 9, wherein the auto-ref library further includes a restriction pattern that excludes a set of application types from referring to the auto-ref library, such that applications having any of the set of application types are not automatically referenced by the application server.

12. The method of claim 11, wherein the restriction pattern is configured in a manifest file as a name value pair.

13. The method of claim 11, wherein the restriction pattern is configured using a graphical user interface.

14. The method of claim 9, wherein the application server is repackaged as a middleware product by deploying a set of extensions as one or more auto-ref libraries and superseding libraries.

15. The method of claim 9, wherein a container of the application server merges the application fragment code and configuration data into the application code and configuration data at the time of deploying the particular deployed application.

16. The method of claim 9, further comprising:
deploying a system filter as a shared library on the application server, such that said system filter intercepts requests flowing to the application and performs monitoring or security functionality on the requests.

17. A non-transitory computer-readable storage medium carrying one or more sequences of instructions for providing a model for system-wide application extension, which instructions, when executed by one or more processors, cause the one or more processors to carry out the steps of:

repackaging an application server by deploying one or more application extensions as at least a first shared library and a second shared library on said application server,
wherein the first shared library includes fragment code and fragment configuration data to implement the one or more application extensions, and a first tag which identifies the first shared library as an auto-ref library, and
wherein the second shared library contains superseding code and superseding configuration data and a second tag, different than the first tag, which identifies the second shared library as a superseding library;

deploying a plurality of applications on the application server, wherein each application is associated with an application type, and includes application code and application configuration data;

wherein when a particular application of said plurality of applications is deployed on the application server as a particular deployed application, the application server causes the particular deployed application to automatically reference the auto-ref library unless the application type associated with the particular application is excluded by the auto-ref library; and automatically merging the fragment code and the fragment configuration data of the auto-ref library with the application code and the application configuration data of the particular application upon deployment, wherein when referencing the auto-ref library, the fragment code and the fragment configuration data of the auto-ref library are merged into the application code and application configuration data of the particular application without replacing conflicting application code and application configuration data, and conflicting application code and application configuration data of the particular application are used without modification in the particular deployed application;

wherein when the particular application is deployed on the application server, the application server also causes the particular deployed application to automatically reference the superseding library unless the application type associated with the particular application is excluded by the superseding library; and automatically merging the application code and configuration data of the particular application with the superseding code and the superseding configuration information, wherein when referencing the superseding library, the superseding code and the superseding configuration data override the application code and application configuration data of the particular application, such that conflicting application code and application configuration data is replaced by the superseding code and superseding configuration data in the particular deployed application, and wherein application code and application configuration data of the particular application that is not replaced by the superseding library is used without modification in the particular deployed application.

18. The non-transitory computer-readable storage medium of claim 17, wherein the superseding library includes a restriction pattern that excludes a set of application types from referring to the superseding library, such that applications having any of the set of application types are not automatically referenced by the application server.

19. The non-transitory computer-readable storage medium of claim 18, wherein the restriction pattern is configured in a manifest file as a name value pair.

20. The non-transitory computer-readable storage medium of claim 17, wherein a container of the application server merges the application fragment code and configuration data into the application code and configuration data at the time of deploying the particular deployed application.

* * * * *

UNITED STATES PATENT AND TRADEMARK OFFICE
CERTIFICATE OF CORRECTION

| | | |
|---|---|---|
| PATENT NO. | : 8,707,294 B2 | Page 1 of 1 |
| APPLICATION NO. | : 12/419685 | |
| DATED | : April 22, 2014 | |
| INVENTOR(S) | : Bajaj et al. | |

It is certified that error appears in the above-identified patent and that said Letters Patent is hereby corrected as shown below:

In the Specification

In column 4, line 53, delete "rather then" and insert -- rather than --, therefor.

Signed and Sealed this
Twenty-sixth Day of August, 2014

Michelle K. Lee
*Deputy Director of the United States Patent and Trademark Office*